Figure 1:
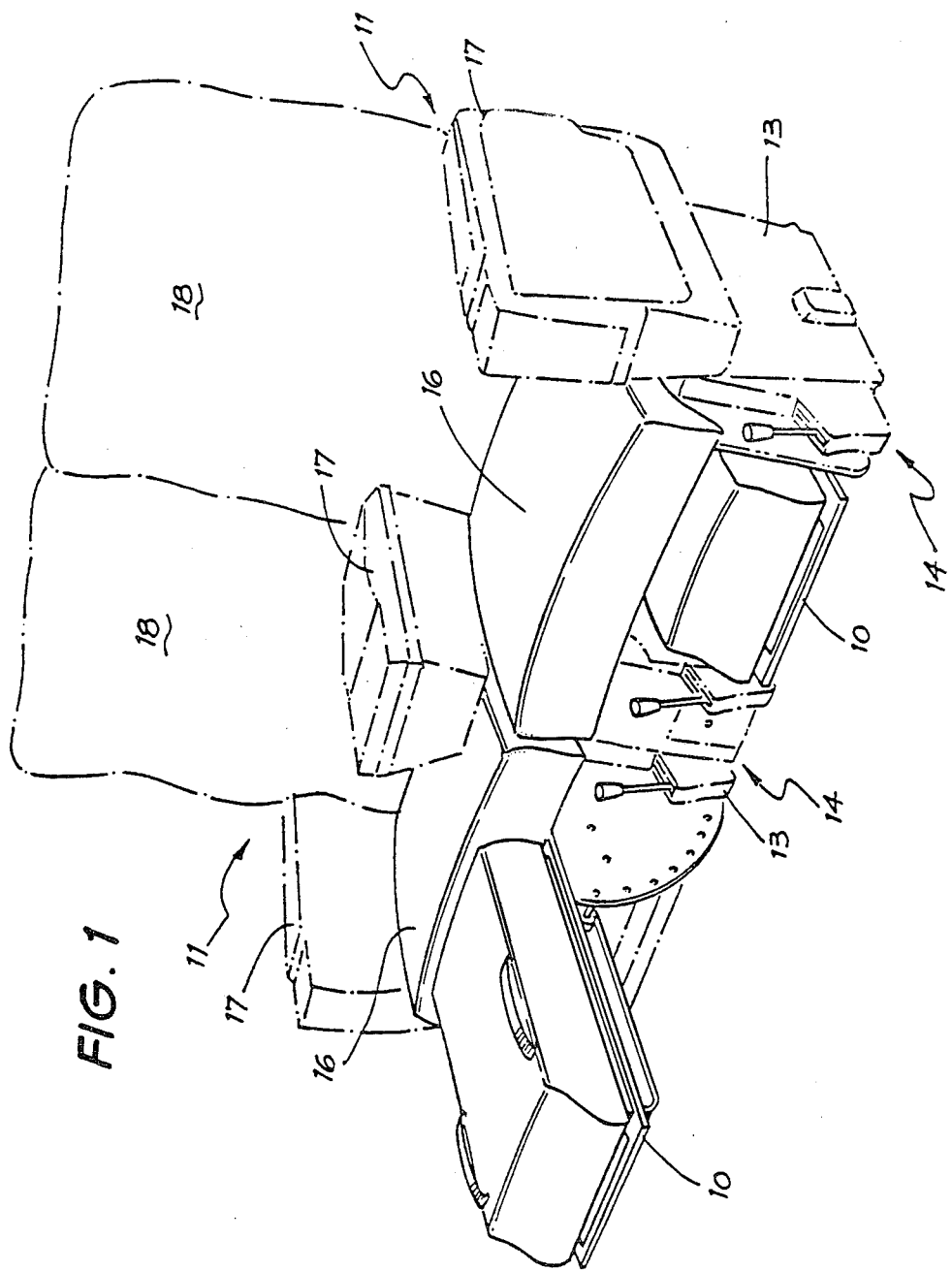

United States Patent [19]

McKean et al.

[11] 4,410,215
[45] Oct. 18, 1983

[54] RETRACTABLE LEG REST FOR A CHAIR

[75] Inventors: Eric J. McKean, Lugarno; David P. Downey, Five Dock, both of Australia

[73] Assignee: Qantas Airways Limited, Sydney, Australia

[21] Appl. No.: 261,180

[22] PCT Filed: Aug. 28, 1980

[86] PCT No.: PCT/AU80/00054
§ 371 Date: Apr. 28, 1981
§ 102(e) Date: Apr. 28, 1981

[87] PCT Pub. No.: WO81/00509
PCT Pub. Date: Mar. 5, 1981

[30] Foreign Application Priority Data

Aug. 28, 1979 [AU] Australia .................. PE0234

[51] Int. Cl.³ .............................................. A47C 7/50
[52] U.S. Cl. .................................. 297/429; 297/431
[58] Field of Search ............. 297/429, 430, 431, 432, 297/433, 435, 434, 68

[56] References Cited

U.S. PATENT DOCUMENTS 2,484,803 10/1949 Bell et al. ............................ 297/432
2,514,447 7/1950 Hendrickson et al. ............. 297/432
2,901,025 8/1959 Malitte ................................ 297/431

Primary Examiner—Francis K. Zugel
Attorney, Agent, or Firm—Emory L. Groff, Jr.

[57] ABSTRACT

A retractible leg rest for an aircraft chair which is stowed beneath the seat when not in use. The leg rest is mounted on a platform attached to an articulated frame mounted beneath the chair. The reticulated frame includes two quadrant plates which are pivoted at their centers about a horizontal bar extended beneath the front of the seat. The platform quadrant plates are connected by linkage arms and link members so that when the platform is drawn outward from beneath the chair, the quadrant members are swung upward by the link members and the linkage arms elevate the rear of the platform along an arcuate path which passes clear of the front of the seat of the chair so that the leg rest is brought into leg-support relationship with the seal of the chair. The angle of the leg rest to the seat is adjustable by means of an array of notches with quadrant members.

4 Claims, 5 Drawing Figures

RETRACTABLE LEG REST FOR A CHAIR

BACKGROUND ART OF THE INVENTION

Hitherto, leg rests for chairs have been of such shape and configuration that they could not be successfully used with aircraft chairs because of the limited space available in an aircraft. Moreover, there has been no solution to the problem that the leg rest must be clear of the chair when not in use.

It is an object of this invention to provide a leg rest for a chair such as an aircraft chair which connected to an articulated frame so designed that the leg rest when not in use is stowed beneath the seat but which may be readily and simply drawn forward and upward for use.

According to the invention there is provided a leg rest for a chair of the kind having a framework defining a pair of spaced apart support legs and a base for a seat, the base and the support legs forming a storage space beneath the seat which is accessible from the front of the chair, said leg rest comprising:

(i) a pair of mounting brackets spaced apart by at least the width of the leg rest and adapted to be secured to the framework of the chair, (ii) a platform for supporting a leg rest cushion adapted to be stowed in the storage space beneath the seat when not in use and to be moved into adjustable leg-supporting relationship with the seat of the chair by an articulating frame which includes:

(a) an off-set linkage arm at each side of the platform each linkage arm being pivotally connected at one end to one of the mounting brackets and at the other end to the rear of the platform, (b) a quadrant member on each side of the platform, each quadrant member being pivotally connected at its centre to any of the mounting brackets forward of the connection of the respective linkage arm, each quadrant member being located in the storage space when the platform is stowed there, (c) a link member connecting each linkage arm to the adjacent quadrant member so that movement of the linkage arms is transmitted as arcuate movement of the quadrant members, (d) a platform support roller extending inwardly from the forward arcuate extremity of each quadrant member and slidably engaged in a slot formed in the respective side of the platform, (e) a locking bar extending between the mounting brackets and beneath the arcuate periphery of the quadrant members and adapted to engage a corresponding pair of locking notches on the rear portion of the arcuate periphery of each quadrant member, and, (f) release means for disengaging the locking bar, the arrangement being such that when the platform is drawn forward from the storage space, the quadrant members are swung forward by the link members with the support rollers running rearward in the platform slots and the linkage arms elevate the rear of the platform along an arcuate path which passes clear of the front of the chair base so that the leg rest is brought into leg-support relationship with the seat of the chair, the angle of the platform to the seat being determined by the location of the locking notches on the quadrant members.

Figure 2:
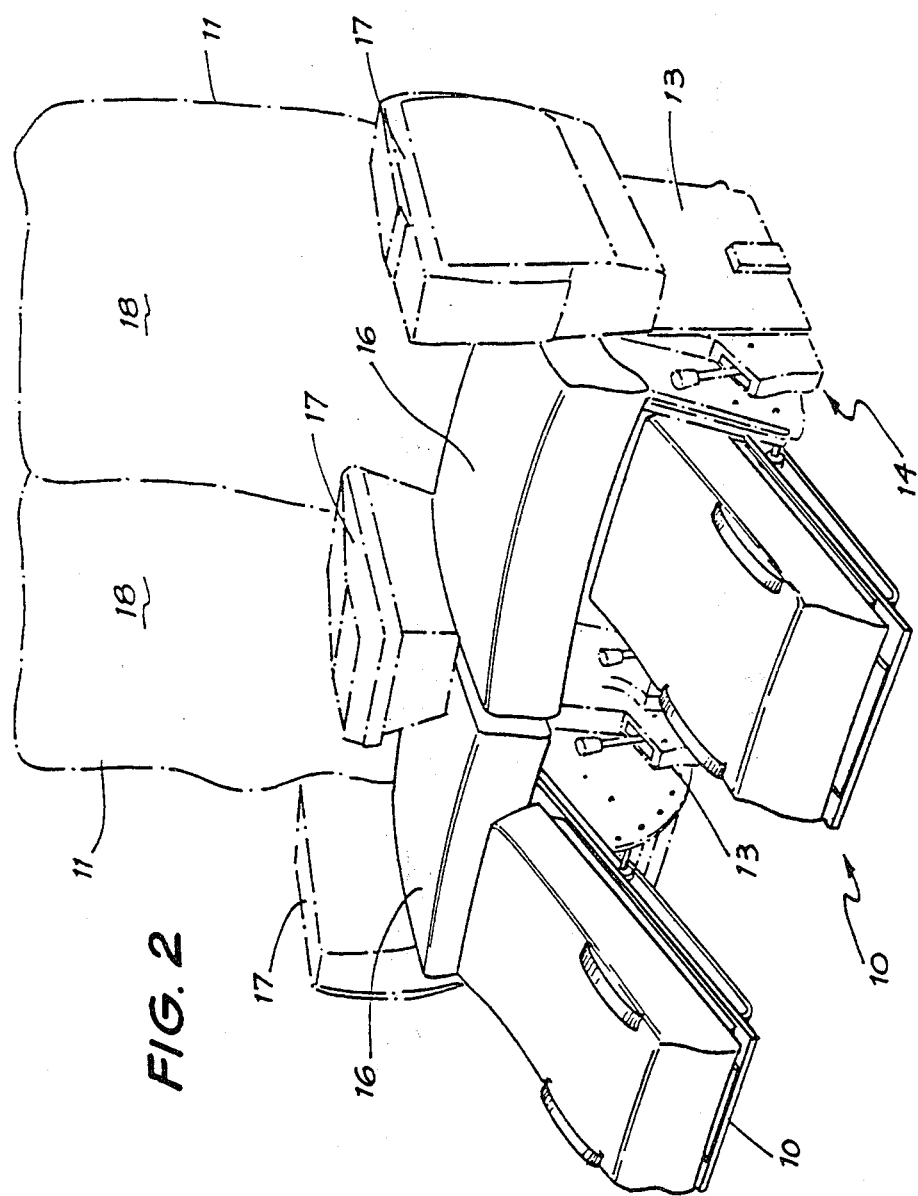
Figure 3:
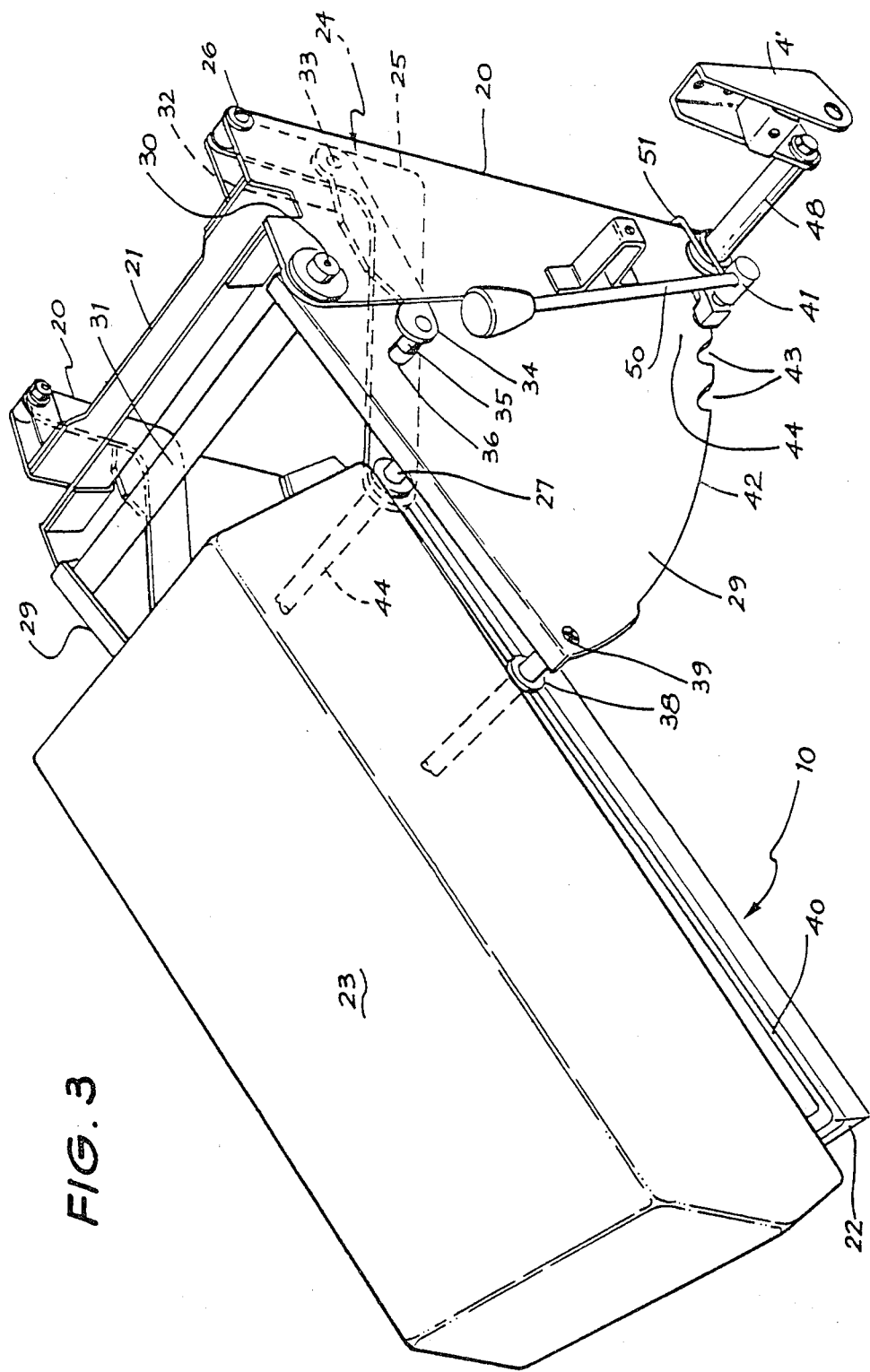
Figure 4:
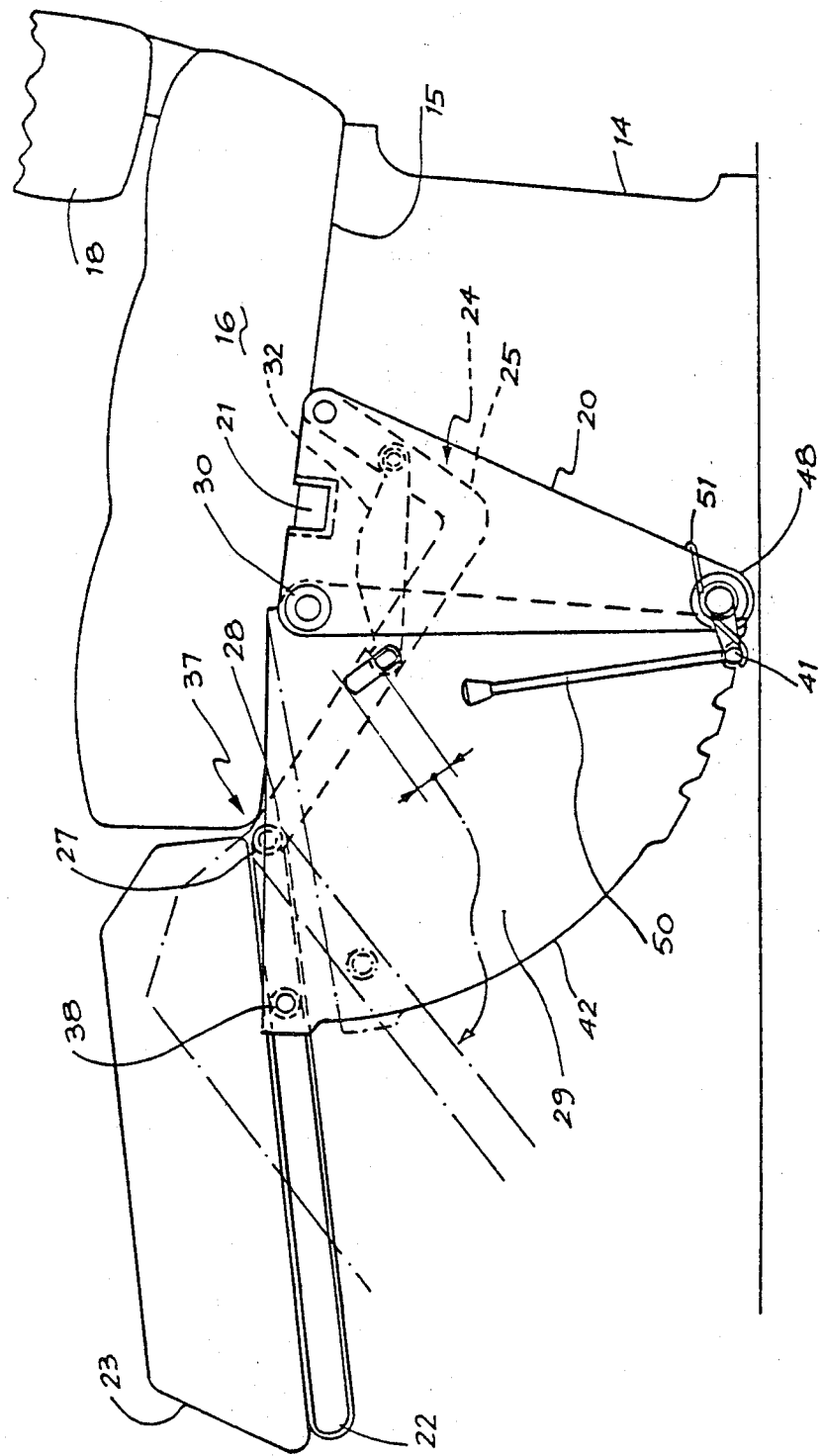
Figure 5:
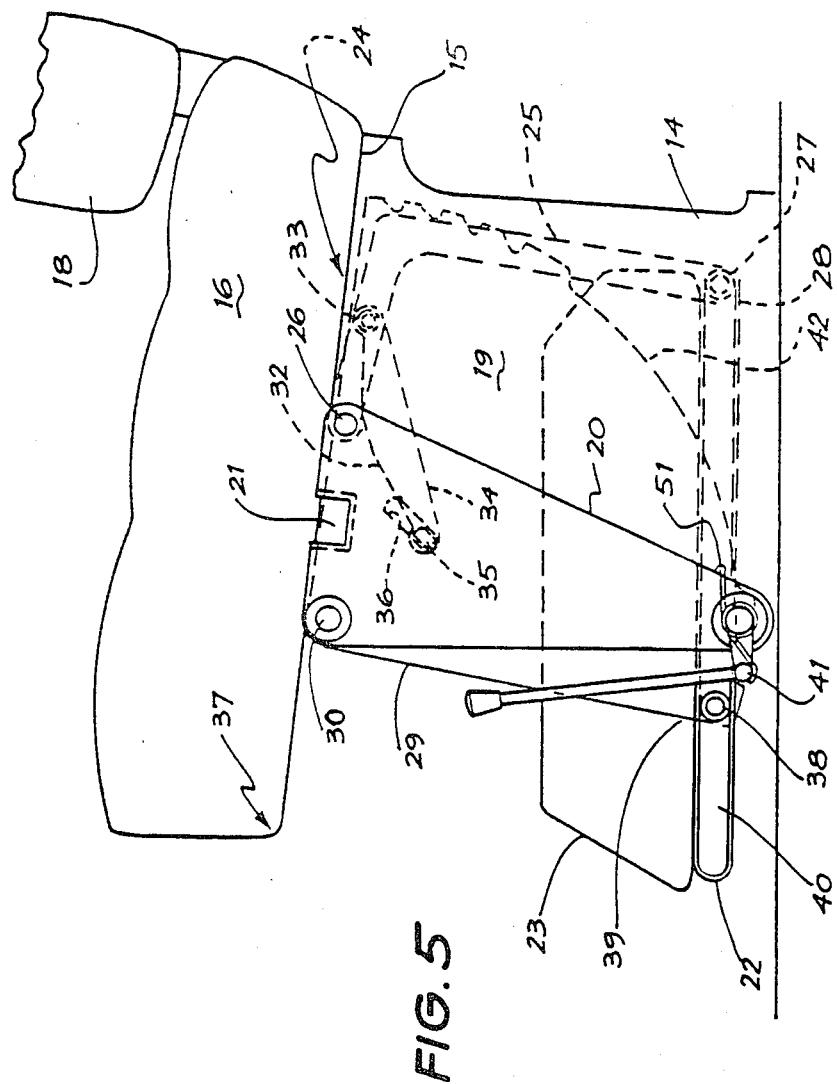

In order that the invention may be more readily understood and put into practical effect reference will now be made to the accompanying drawings in which:

FIG. 1 is a perspective view of a double aircraft chair incorporating a leg rest according to one embodiment of the invention with one leg rest shown in the stowed position and the other in the operative position, FIG. 2 is a view similar to FIG. 1 showing one leg rest almost withdrawn from the storage space and the other in a different operative position, FIG. 3 is a perspective view of the leg rest assembly shown in FIGS. 1 and 2, FIG. 4 is a partly broken away side elevational view of portion of the chair shown in FIG. 1 with the leg rest shown in the operative position, FIG. 5 is a partly broken away side elevational view of portion of the chair shown in FIG. 1 with the leg rest shown in the stored position.

In the preferred embodiment of the invention the leg rest 10 is used with a double aircraft chair in which each chair 11 has a framework 12 and panels 13 defining a pair of spaced apart support legs 14, a base 15 for a seat 16 and conventional side arms 17 and reclining back 18. The base 15 and the support legs 14 form a storage space 19 beneath the seat 16 which is accessible from the front of the chair.

A pair of elongate mounting brackets 20 spaced apart by at least the width of the leg rest are secured together by channel 21 adapted to engage the framework of the chair 11. A platform 22 supports a leg rest cushion 23 which is stowed in the storage space 19 beneath the seat when not in use (see FIG. 1) and moved into adjustable leg-supporting relationship with the seat 16 of the chair 11 by an articulated frame 24 when required.

The articulated frame 24 includes an off-set linkage arm 25 at each side of the platform 22, each linkage arm being pivotally connected at one end 26 to one of the mounting brackets 20 and at the other end 27 to the rear 28 of the platform 22 by means of a rod 44. A quadrant member 29 is provided on each side of the platform 22 and each quadrant member 29 is pivotally connected at its centre 30 to one of the mounting brackets 20 forward of the connection 26 of the respective linkage arm by means of rod 31. Each quadrant member 29 is located in the storage space 19 when the platform 22 is stowed there.

A link member 32 connects each linkage arm 25 to the adjacent quadrant member 29 so that movement of the linkage arms 25 is transmitted as arcuate movement of the quadrant members 29.

In this instance, each link member 32 is pivotally connected at one end 33 to the linkage arm 25 and the other end 34 has a roller 35 which is engaged in an arcuate slot 36 in the upper portion of each quadrant member 29. The roller 35 and slot 36 provide a measure of lost motion in the operation of the articulated frame 24 which ensures that the quadrant members 29 are fully located in the storage space 19 and allows sufficient clearance of the rear 28 of the platform 22 during movement of the rear of the platform adjacent the bottom front edge 37 of the base 15.

A platform support roller 38 extends inwardly from the forward arcuate extremity 39 of each quadrant member 29 and slidably engages in a slot 40 formed in the respective sides of the platform 22. A locking bar 41 extends between the mounting brackets 20 and beneath the arcuate periphery 42 of the quadrant members 29 and is adapted to engage a corresponding pair of a plurality of locking notches 43 on the rear portion 44 of the arcuate periphery 42 of each quadrant member 29.

As shown in FIGS. 3, 4 and 5, the locking bar 41 is mounted on cross bar 48 which projects through the lower portion of each mounting bracket 20 to provide support for bracket means 49 used to secure the leg rest to the framework of the chair 11.

A release lever 50 is provided at each end of the locking bar 41 which is biased upwardly by the spring 51 (see FIG. 3).

To operate the leg rest, the platform 22 and cushion 23 are drawn forward from the storage space 19 whereupon the quadrant members 29 are swung forward by the link members 32 with the support rollers 38 running rearward in the platform slots 40. The linkage arms 25 elevate the rear 28 of the platform 22 along an arcuate path which passes clear of the front edge 37 of the chair base 15 so that the leg rest 10 is brought into leg-support relationship with the seat of the chair, the angle of the platform to the seat being determined by the location of the locking bar in the locking notches on the quadrant members. To stow the leg rest, the release levers 50 are pressed forward.

We claim:

1. A leg rest for a chair of the kind having a framework defining a pair of spaced apart support legs and a base for a seat, the base and the support legs forming a storage space beneath the seat which is accessible from the front of the chair, said leg rest comprising:
   (i) a pair of mounting brackets spaced apart by at least the width of the leg rest and adapted to be secured to the framework of the chair,
   (ii) a platform for supporting a leg rest cushion adapted to be stowed in the storage space beneath the seat when not in use and to be moved into adjustable leg-supporting relationship with the seat of the chair by an articulating frame which includes:
   (a) an off-set linkage arm at each side of the platform, each linkage arm being pivotally connected at one end to one of the mounting brackets and at the other end to the rear of the platform,
   (b) a quadrant member on each side of the platform, each quadrant member being pivotally connected at its centre to any of the mounting brackets forward of the connection of the respective linkage arm, each quadrant member being located in the storage space when the platform is stowed there,
   (c) a link member connecting each linkage arm to the adjacent quadrant member so that movement of the linkage arm is transmitted as arcuate movement of the quadrant members,
   (d) a platform support roller extending inwardly from the forward arcuate extremity of each quadrant member and slidably engaged in a slot formed in the respective side of the platform,
   (e) a locking bar extending between the mounting brackets and beneath the arcuate periphery of the quadrant members and adapted to engage a corresponding pair of locking notches on the rear portion of the arcuate periphery of each quadrant member, and,
   (f) release means for disengaging the locking bar, the arrangement being such that when the platform is drawn forward from the storage space, the quadrant members are swung forward by the link members with the support rollers running rearward in the platform slots and the linkage arms elevate the rear of the platform along an arcuate path which passes clear of the front of the chair base so that the leg rest is brought into leg-support relationship with the seat of the chair, the angle of the platform to the seat being determined by the location of the locking notches on the quadrant members.

2. A leg rest according to claim 1 wherein there is provided a plurality of corresponding notches at the rearward portion of the quadrant members whereby the angle of platform to the seat may be selectively varied.

3. A leg rest according to claim 1 wherein the connection of each link member to the respective quadrant member comprises an arcuate slot in the quadrant member and a roller on the end of the link which is positioned in the slot.

4. An aircraft chair having a framework defining a pair of spaced apart support legs and a base for a seat, the base and the support legs forming a storage space beneath the seat which is accessible from the front of the chair and further including a leg rest according to claim 1.

* * * * *